US008855890B2

(12) United States Patent
Egle et al.

(10) Patent No.: US 8,855,890 B2
(45) Date of Patent: Oct. 7, 2014

(54) ENGINE SYNCHRONIZER

(75) Inventors: Lawrence E. Egle, Sarasota, FL (US); Aaron S. Dickey, Sarasota, FL (US)

(73) Assignee: Evoke Technology LLC, Tallevast, FL (US)

( * ) Notice: Subject to any disclaimer, the term of this patent is extended or adjusted under 35 U.S.C. 154(b) by 574 days.

(21) Appl. No.: 13/227,595

(22) Filed: Sep. 8, 2011

(65) Prior Publication Data

US 2011/0315113 A1 Dec. 29, 2011

Related U.S. Application Data

(63) Continuation-in-part of application No. 12/148,315, filed on Apr. 18, 2008, now Pat. No. 8,036,809.

(60) Provisional application No. 60/912,518, filed on Apr. 18, 2007.

(51) Int. Cl.
| | |
|---|---|
| *G06F 19/00* | (2011.01) |
| *F02D 11/10* | (2006.01) |
| *F02D 9/10* | (2006.01) |
| *F02B 73/00* | (2006.01) |
| *B64D 31/04* | (2006.01) |
| *B64D 31/12* | (2006.01) |
| *F02D 25/02* | (2006.01) |
| *F02D 11/04* | (2006.01) |

(52) U.S. Cl.
CPC ............. *B64D 31/12* (2013.01); *B64D 31/04* (2013.01); *F02D 25/02* (2013.01); *F02D 11/04* (2013.01)
USPC ........... 701/103; 123/399; 123/400; 123/403; 60/700; 60/702

(58) Field of Classification Search
CPC ...... F02D 25/02; B63B 2759/00; B64D 31/12
USPC ............ 60/698, 700, 701, 702; 123/336, 342, 123/350, 352, 361, 396, 399, 403; 440/87; 701/102, 103, 110, 115
See application file for complete search history.

(56) References Cited

U.S. PATENT DOCUMENTS

| | | | |
|---|---|---|---|
| 3,258,927 A | 7/1966 | Herbet | |
| 3,367,110 A | 2/1968 | Leeson | |
| 3,986,363 A | 10/1976 | Beaman | |
| 4,435,961 A * | 3/1984 | Stewart | ........................... 60/719 |
| 4,479,357 A | 10/1984 | Stewart | |
| 4,586,341 A * | 5/1986 | Kobus | ............................ 60/711 |
| 4,718,869 A | 1/1988 | Fisher | |
| 4,741,165 A | 5/1988 | Kobus | |
| 4,964,276 A * | 10/1990 | Sturdy | ........................... 60/700 |
| 5,142,473 A | 8/1992 | Davis | |

(Continued)

*Primary Examiner* — Thomas Moulis
*Assistant Examiner* — Elizabeth Hadley
(74) *Attorney, Agent, or Firm* — William G. Giltinan; Carlton Fields Jorden Burt, PA

(57) ABSTRACT

Engine synchronization apparatus and system for multi-engine vehicles such as boats and aircraft providing limited authority throttle cable trim effected by an apparatus interposed between the throttle plate and throttle cable of a slave engine and mounted in a floating configuration. An actuator is mounted to the apparatus to trim the distance between the throttle plate and throttle cable attachment thereby trimming the throttle cable. A system is provided in which a difference signal derived from master and slave engine tachometer signals is used to control the actuator and synchronize the engines within a predetermined range.

21 Claims, 7 Drawing Sheets

(56) References Cited

U.S. PATENT DOCUMENTS

| | | | |
|---|---|---|---|
| 5,222,901 A * | 6/1993 | Burkenpas | 440/86 |
| 5,741,166 A | 4/1998 | Newman | |
| 5,771,860 A * | 6/1998 | Bernardi | 123/352 |
| 6,233,943 B1 | 5/2001 | Beacom et al. | |
| 6,414,607 B1 | 7/2002 | Gonring et al. | |
| 6,485,340 B1 | 11/2002 | Kolb et al. | |
| 6,587,765 B1 | 7/2003 | Graham et al. | |
| 6,611,748 B2 | 8/2003 | Greene | |
| 6,694,741 B2 | 2/2004 | Franklin | |
| 6,751,533 B2 | 6/2004 | Graham et al. | |
| 6,840,888 B1 | 1/2005 | Winquist et al. | |
| 6,965,817 B2 | 11/2005 | Graham et al. | |
| 7,121,908 B2 | 10/2006 | Okuyama | |
| 7,142,955 B1 | 11/2006 | Kern et al. | |
| 7,530,865 B2 | 5/2009 | Kado | |
| 8,357,019 B2 * | 1/2013 | Frizon et al. | 440/6 |

* cited by examiner

ENGINE SYNCHRONIZER

The present application is a continuation-in-part of U.S. patent application Ser. No. 12/148,315 filed Apr. 18, 2008, which claims priority from U.S. Provisional Patent Application No. 60/912,518 filed Apr. 18, 2007, the contents of which are hereby incorporated in their entirety by reference.

BACKGROUND

The present invention relates to engine synchronization in multiple engine vessels. It is common in many vehicle applications to use two or more engines, for example in multi-engine boats and airplanes. Multiple engines are most effective when the engine speeds (rpm) are synchronized. If the engines are not synchronized, a noticeable and irritating beat frequency is generated. Operating multiple engines in a non-synchronized mode forces one engine to work harder than the other, which reduces overall efficiency and may lead to premature failure of the vessel structure.

Modern multiple engine boats and aircraft often include expensive synchronization features using various technologies, including, for example, hydraulic power, servo motors, fuel supply control, computerized operation, and drive-by-wire devices.

For obvious safety reasons, synchronization devices require safe failure modes, whereby in the event of failure of the device, the engines remain operable. Further, marine devices must be robust and corrosion resistant to perform reliably in a salt-water environment. A desirable design feature permits an operator to manually override synchronization, for example when different engine speeds are required for low-speed maneuvers such as docking. This may be achieved, for example, by restricting synchronization to the condition where the engine speeds are within a predetermined range.

As a result of these and other design considerations, the devices of the prior art are generally complex, expensive, bulky, and the cost of installation can be significant due to the requirement for skilled labor and expensive materials. This places most such systems out of the reach of the common boat owner or aircraft owner.

Information relevant to attempts to address these problems can be found, for example, in U.S. Pat. Nos. 5,222,901; 5,142,473; 4,718,869; 5,741,166; 6,414,607; 6,233,943; 6,485,340; 6,587,765; 6,611,748; 6,694,741; 6,751,533; 6,840,888; 6,965,817; 7,121,908; and 7,142,955. However, each one of these references suffers from one or more of the following disadvantages: the devices comprise many parts, increasing the risk of component failure and the cost of manufacture; the devices are of large size, taking up valuable boat or aircraft space; and/or the devices are complex, making installation and maintenance a skilled operation that may be difficult and expensive.

For at least the foregoing reasons, there is a need for a small, low cost, low component count, easily installed and maintained engine synchronizer suitable as original equipment or for retrofitting to multi-engine vehicles such as boats or aircraft, and for OEM applications.

SUMMARY

The present invention is directed to an apparatus and system that satisfies the aforementioned needs and more. An apparatus having features of the present invention has an actuator comprising a motor assembly and a shaft. The motor assembly is capable of displacing the shaft along its axis and is attached to, or is integral with, an elongate bracket extending from the motor assembly and disposed substantially adjacent to the axis of the shaft. The distal end of the bracket has a mounting, for example a throttle cable tube, for securing one end of a throttle cable or the like. The bracket further has an elongate aperture that extends substantially parallel and adjacent to the axis of the shaft. A coupling, such as a bolt, is mounted to the distal end of the shaft and extends through the aperture to engage a throttle plate, whereby the apparatus is mounted in a novel floating configuration.

In another aspect, the present invention is directed to an apparatus for synchronizing the rotational speeds of a master engine and one or more slave engines. In this aspect, the engines each have rotational speed sensors such as tachometers, and the slave engine or engines each have a throttle plate and a throttle cable, or their equivalent, for controlling the rotational speed of the engine. In this aspect, the apparatus has a first means for operably attaching to the throttle cable of the slave engine and a second means for operably attaching to the throttle plate of the slave engine. The apparatus also has a means for comparing the rotational speeds of the master and slave engine or engines and for providing a difference signal. The apparatus is further provided with a means for adjusting the distance between the first and second means within predetermined limits to trim the throttle cable length in response to the difference signal. By these means the speed of the slave engine or engines is synchronized to the speed of the master engine.

In another aspect, the present invention is directed to a system for synchronizing the rotational speeds of engines of a multi-engine vehicle. A system having features of the present invention has a master engine and at least one slave engine mounted to the vehicle. Each engine has a rotational speed sensor, such as a tachometer. The slave engine or engines also have a throttle cable and a throttle plate, or their equivalent, for operating the engine, and an apparatus according to the present invention mounted to the throttle cable and the throttle plate. The system has a controller, such as an electronic controller, for comparing the output of the master engine sensor and the outputs of the sensors of the slave engine or engines. The controller generates a difference signal that is used for controlling the motor assembly of each slave engine apparatus within predetermined limits, whereby the rotational speed of each slave engine is synchronized to the rotational speed of the master engine when the rotational speeds of said master and slave engines are within a predetermined speed range.

It is a feature of the present invention that a cable length trim function, or its equivalent, is provided. In a preferred apparatus of the present invention, the actuator is mounted to the throttle plate in a unique floating configuration, whereby operation of the actuator effectively trims motor speed as described herein.

In certain embodiments, the controller of the instant system is a control board with a microcontroller. In such embodiments, the control board receives filtered signals from the tachometer and counts the difference in pulses between the master and slave engines. The pulse information is electronically processed to provide a signal for controlled movement of the linear actuator and thereby the trim of the throttle cable and engine rpm.

It is another feature of certain embodiments of the present invention that the apparatus provides only limited authority of approximately 20% of the throttle stroke. The device is preferably configured to operate only when turned on by the operator and is preferably configured to turn off at low rpm when synchronization is not necessary, for example during docking maneuvers.

It is another feature of the present invention that it provides for easy installation and for a fail safe mode. A catastrophic and unlikely failure of the apparatus or system will not render a vessel inoperable, which is a requirement for marine vessels and aircraft.

The present invention can be used in any multi-engine vessel, aircraft, or device where the slave engine control consists, in whole or in part, of a cable actuation or its equivalent.

It is therefore an object of the present invention to provide a small, low cost, low component count, easily installed and maintained engine synchronizer apparatus and system.

BRIEF DESCRIPTION OF THE DRAWINGS

These and other features, aspects, and advantages of the present invention will become better understood with regard to the following description, appended claims, and accompanying drawings where:

DETAILED DESCRIPTION

Certain exemplary but non-limiting embodiments of the present invention are now described for illustrative purposes only, with reference to the attached drawings.

As used herein, the term throttle refers without limitation to any mechanical device for controlling the operating speed of an engine. The term is expressly not limited to a device for speed control in engines in which speed is controlled by restricting air flow into a carburetor, but also encompasses, for example, levers for controlling fuel flow into a diesel or other fuel injected engine, or the like.

Likewise, as used herein, the term throttle plate is not limited to a plate operably connected to control airflow in a carburetor intake, but instead refers without limitation to any mechanical device, the displacement of which is used to control the operating speed of an engine.

Figure 1:
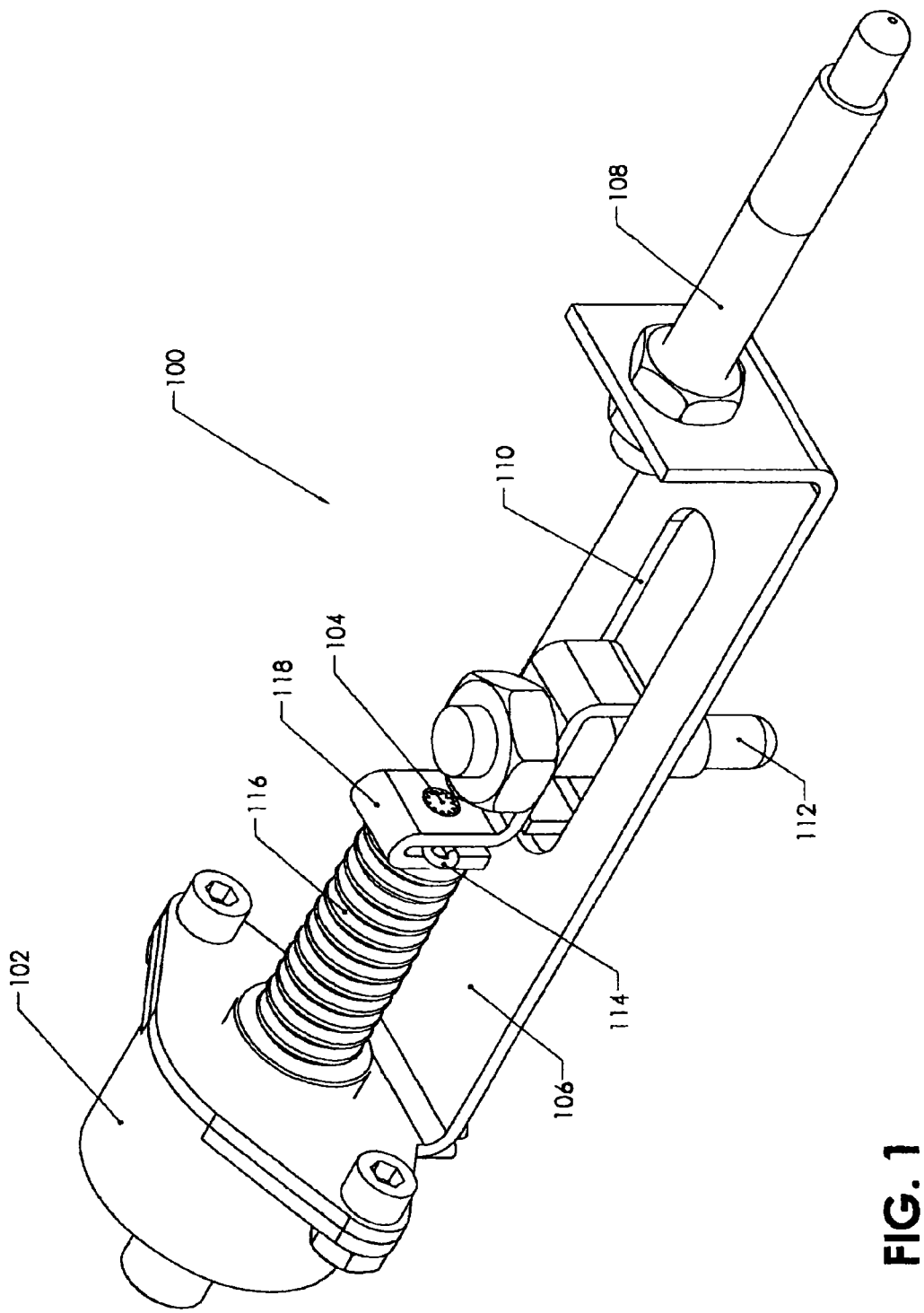
FIG. 1 is a perspective view of an engine synchronization apparatus according to one embodiment of the present invention.
Figure 2:
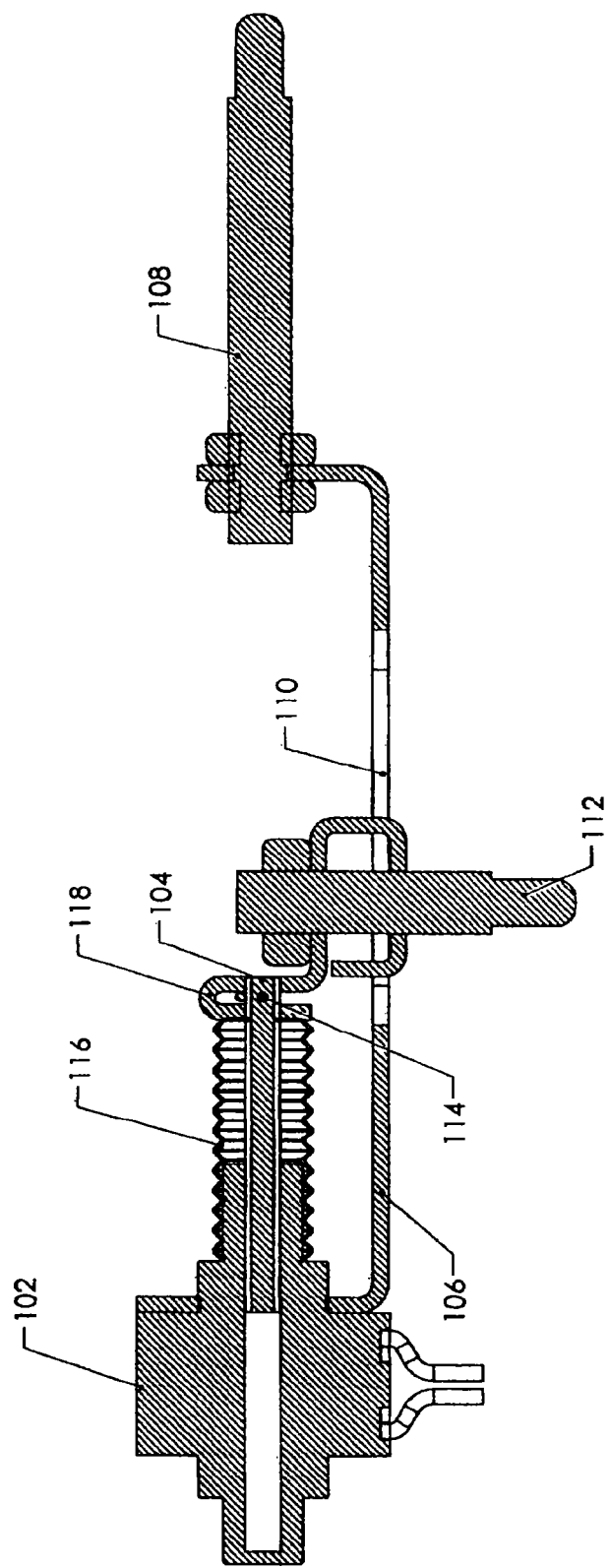
FIG. 2 is a longitudinal section of the apparatus of FIG. 1.

Referring now to FIGS. 1 and 2, an apparatus 100 according to the present invention comprises an actuator 102 comprising a motor assembly operably connected to shaft 104 and capable of displacing the shaft 104 along its axis. Optionally, shaft 104 is enclosed along its exposed length by an expandable, protective bellows 116. The actuator 102 is mounted to, or is integral with, actuator bracket 106, which extends substantially adjacent to the axis of shaft 104. The distal end of actuator bracket 106 comprises a means for securing one end of a throttle cable in the form of throttle cable shaft 108. Actuator bracket 106 comprises an elongate aperture 110 extending substantially adjacent and parallel to the axis of shaft 104. Coupling 112 is mounted to the distal end of shaft 104 by means of throttle tab 118, which is secured to shaft 104 by spring clip 114. Coupling 112 extends through aperture 110 to engage a throttle plate.

Actuator 102 can be any electromechanical, hydraulic, or pneumatic device capable of being operably mounted to shaft 104 to controllably displace the shaft along its axis. Pneumatic actuators comprising cylinders and valves are well known in the automotive, marine, and aeronautical arts, as are hydraulic actuators comprising piston, valves, and an incompressible fluid such as oil. In preferred embodiments the actuator comprises an electric motor, such as a brushless DC motor moving a shaft by a rack and pinion drive mechanism, or a proportional or short-stroke solenoid. Electrically activated compliant mechanisms can also be used. The actuator is the active device providing the cable length trim function to the apparatus and system of the present invention, and is most preferably a linear actuator such as is known in the automotive industry for use as an airflow control device for an automobile engine. The linear actuator comprises a stepper motor and a spline-equipped lead screw, herein termed a shaft. Rotation of the shaft extends and retracts it in a linear fashion, while the spline serves to prevent screw rotation. Optionally, a bellows 116 covers the exposed portion of the shaft 104 and the motor is covered with a protective vinyl coating or similar to protect from environmental conditions.

Actuator bracket 106 can be mounted to the actuator 102 by screws, bolts, spot welding, or the like, or can be formed to be integral with the actuator body. When actuator 102 is activated, shaft 104 pushes or pulls upon the plate bolt coupling 112. Because plate bolt 112 is rigidly affixed to a throttle plate, bracket 106 pushes or pulls throttle cable shaft 108, which in turn trims the throttle cable.

Thus, it is a feature of the present invention that the actuator 102 is mounted in a novel floating configuration, which allows it to effectively trim motor speed. The floating configuration also provides for easy installation and for a fail safe mode. A catastrophic and unlikely failure of the synchronizer system will never render a vessel inoperable, which is an absolute requirement for marine products, as the throttle cable will remain operably connected to the throttle plate even if the actuator fails.

Bracket 106 is preferably a stamped sheet metal component of approximately 3/32 thickness, although any suitably rigid, durable, and weather resistant material of suitable thickness can be used. Aperture 110 has a width that is selected to slidingly accommodate coupling 112 without excessive play. Preferably, the coupling 112 extends lengthwise along a portion of the aperture 110 to prevent twisting of the apparatus in use.

The length of aperture 110 is selected to provide a limited degree of trim authority whereby the apparatus can synchronize master and slave engines only if the difference in their engine speeds is within predetermined limits. This feature permits synchronization of the engines to be overridden by an operator by placing the respective throttle controls outside the predetermined range. For example, in preferred embodiments the aperture length can be selected to provide between about one-eighth and about one inch, or between about 5% and 30% of total throttle stroke. Most preferably, about 20% of total throttle stroke authority is provided.

The distal end of actuator bracket 106 comprises a means for securing one end of a throttle cable. Preferably, this means is in the form of throttle cable shaft 108 disposed coaxially with the actuator shaft 104, but any means known in the art for securing a throttle cable can be used, including but not limited to a bolted clamp securing the end of a throttle cable, or a slit retaining a broadened tip of a throttle cable.

Coupling 112 engages the throttle plate, and can be a bolt, pin, or other coupling capable of providing a secure and rigid attachment to the throttle plate and of mounting to the distal end of the shaft 104. In preferred embodiments, throttle tab 118 is secured to the distal end of shaft 104 by spring clip 114, and the tab 118 extends through aperture 110 and provides a support for throttle plate bolt. The throttle tab is preferably a stamped sheet metal component of approximately 3/32 thickness.

Figure 4:
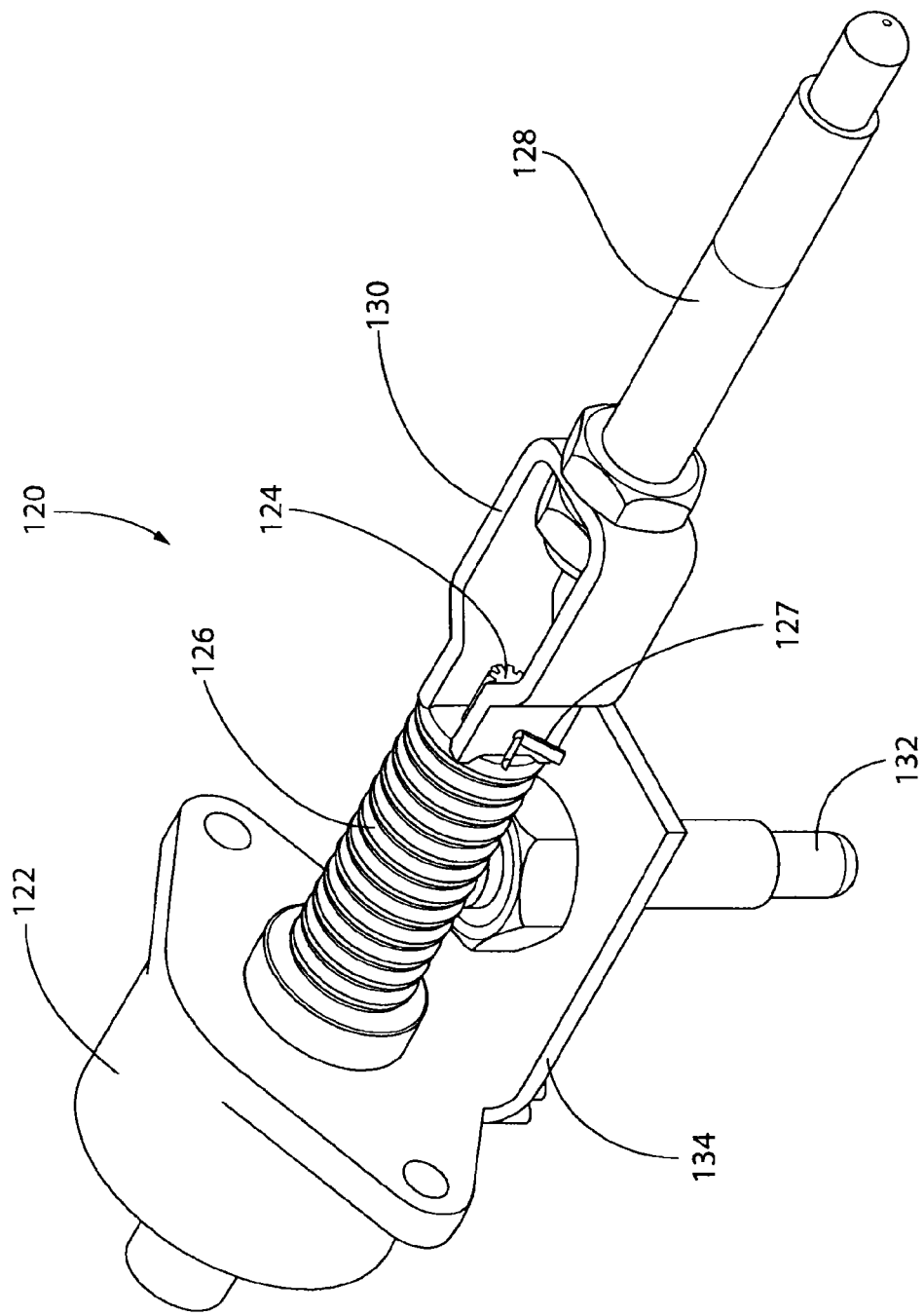
FIG. 4 is a perspective view of an engine synchronization apparatus according to an alternative embodiment of the present invention.

Referring now to FIG. 4, an apparatus 120 according to an alternate embodiment the present invention comprises an actuator 122 comprising a shaft 124 and capable of displacing the shaft 124 along its axis. Optionally, shaft 124 is enclosed along its exposed length by an expandable, protective bellows 126.

First bracket 130 comprises a means for securing one end of a throttle cable in the form of throttle cable shaft 128 at a first bracket end, and a means for attaching to shaft 124 at a second bracket end. As illustrated the attachment between second bracket end and shaft 124 may conveniently be made with a cotter pin 127 extending through first bracket 130 and through shaft 124. A variety of other attachment means, including without limitation threaded fasteners, rivets, welds and other attachment means known in the art may also be used.

Second bracket assembly 134 is connected to actuator 122 and comprises a coupling 132 adapted to connect to a throttle plate. Attachment of second bracket assembly 134 to actuator 122 may be accomplished by mechanical connectors such as screws or bolts, by welding, or by making second bracket assembly 134 integral to actuator 122.

As has been described in connection with actuator 102, actuator 122 can be any electromechanical, hydraulic, or pneumatic device capable of being operably connected to shaft 124 to controllably displace the shaft 124 along its axis. Pneumatic actuators and hydraulic actuators are known in the art and are suitable for use with the present invention. In preferred embodiments the actuator 124 comprises an electric motor, such as a brushless DC motor moving a shaft by a rack and pinion drive mechanism, or a proportional or short-stroke solenoid. Electrically activated compliant mechanisms can also be used. As was described in connection with apparatus 100, the actuator 122 is the active device providing the cable length trim function to the apparatus 120 and system of the present invention, and is most preferably a linear actuator such as is known in the automotive industry for use as an airflow control device for an automobile engine. The linear actuator comprises a stepper motor and a spline-equipped lead screw, herein termed a shaft. Rotation of the shaft extends and retracts it in a linear fashion, while the spline serves to prevent screw rotation. Optionally, bellows 126 covers the exposed portion of the shaft 124 and the motor is covered with a protective vinyl coating or similar to protect from environmental conditions.

In this embodiment, the mass and inherent friction of throttle cable shaft 128 are such that displacement of shaft 124 by actuator 122 causes actuator 122 to move, thereby moving second bracket assembly 134, which in turn causes the throttle plate to move, all without substantially moving first bracket 130 or the throttle cable within throttle cable shaft 128. In this way, actuator 122 is maintained in a floating configuration and is capable of trimming the throttle plate, without having to move the throttle cable within throttle cable shaft 128.

First bracket 130 and second bracket assembly 134 are preferably formed from stamped sheet metal component of approximately 3/32 thickness, although any suitably rigid, durable, and weather resistant material of suitable thickness can be used. Actuator 122 has a range of motion suitable to adjust the throttle plate within a range, whereby the apparatus can synchronize master and slave engines only if the difference in their engine speeds is within predetermined limits. In preferred embodiments the actuator range or motion can be selected to provide between about one-eighth and about one inch, or between about 5% and 30% of total throttle stroke. Most preferably, about 20% of total throttle stroke authority is provided.

Coupling 132 engages the throttle plate, and can be a bolt, pin, or other coupling capable of providing a secure and rigid attachment to the throttle plate and of mounting to second bracket assembly 134.

Figure 3:
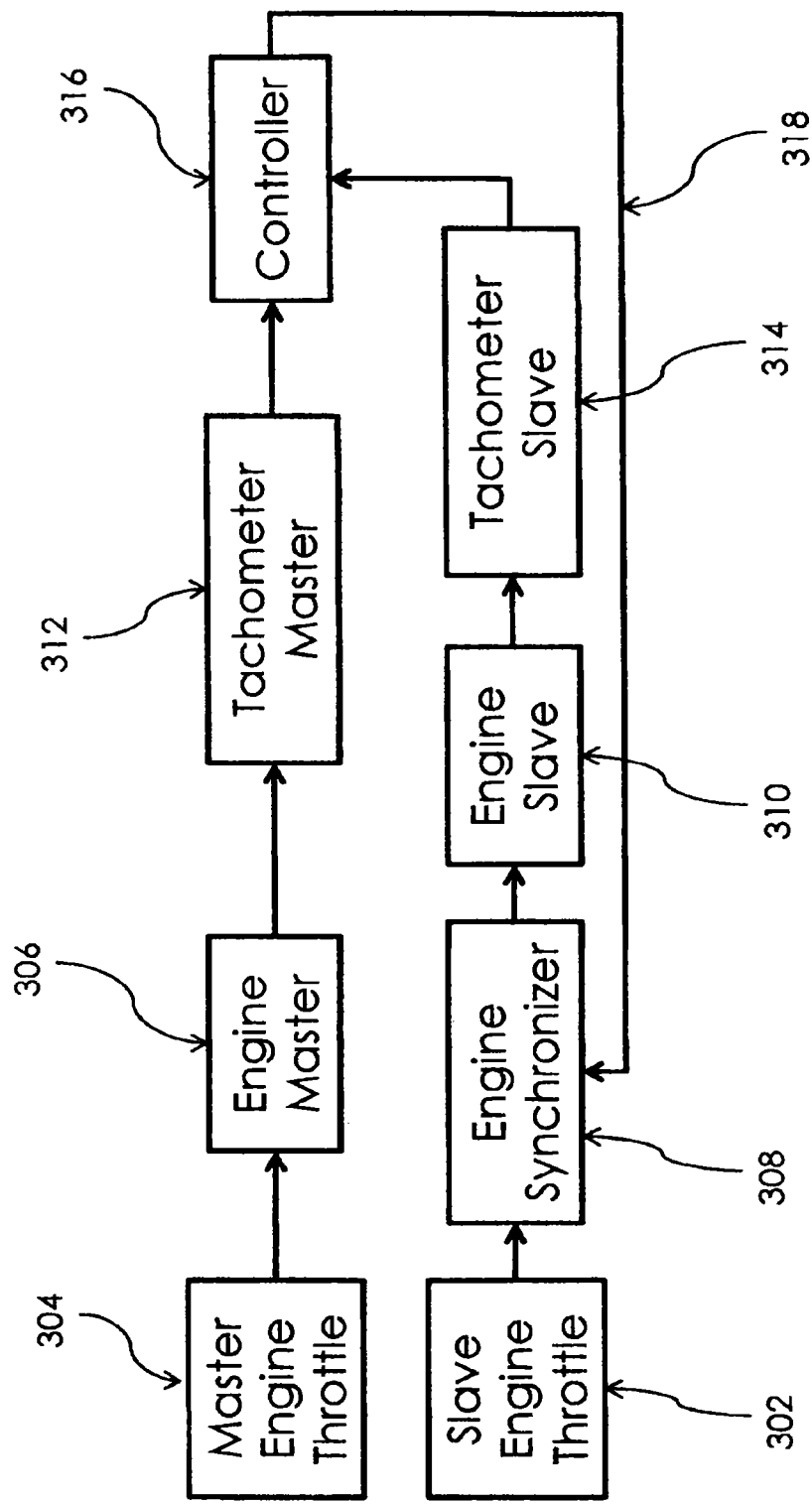
FIG. 3 is a schematic illustration of the operation of an engine synchronization system according to the present invention.

Referring now to FIG. 3, the operation of an engine synchronization system according to the present invention 300 is shown schematically. The master engine throttle 304 and slave engine throttle 302 are controlled by the vehicle operator. Slave engine throttle 302 is in series with engine synchronizer 308, which is an apparatus according to the present invention. Each said engine comprises an engine sensor, such as a tachometer or other device capable of providing a signal that can be used to determine the rotational speed of the engine. Continuous master tachometer 312 and slave tachometer 314 signals are produced from master engine 306 and slave engine 310, respectively, which are fed into controller 316. When the operator initiates synchronous control, controller 316 monitors master tachometer 312 and slave tachometer 314 signals. A difference in the signals indicates that the engines are operating at dissimilar engine speeds. The signals are processed by controller 316 to provide feedback signal 318, which is fed to engine synchronizer 308 to control operation of the actuator to trim the throttle cable of the slave engine 310 such that master engine 306 and slave engine 310 maintain the same engine speeds.

Figure 5:
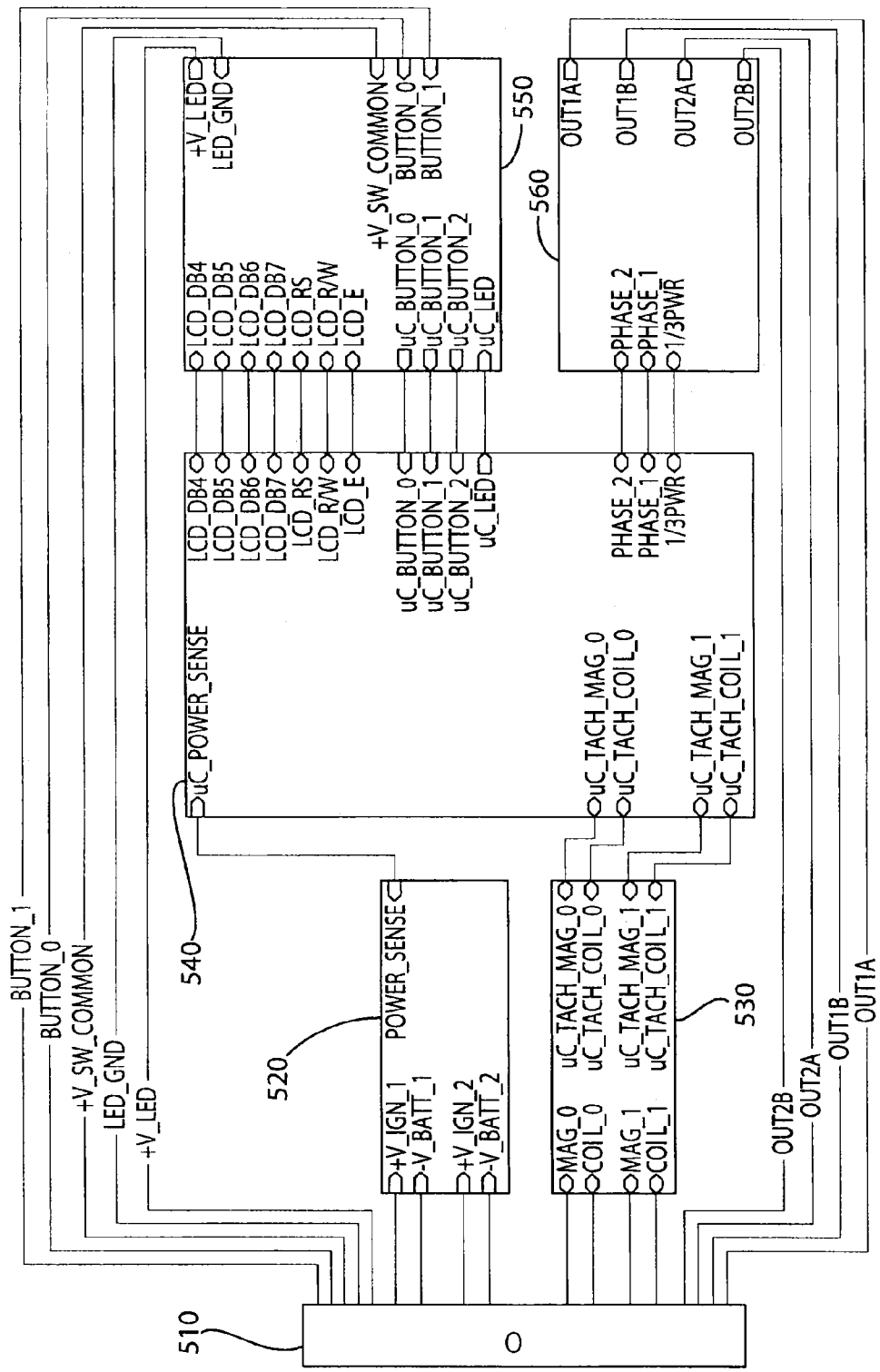
FIG. 5 is a schematic circuit diagram suitable for use in an embodiment of the controller illustrated in FIG. 3.

Referring now to FIG. 5, there is shown a schematic circuit diagram for a controller of a system according to the present invention. It will be readily understood that a controller can be implemented using numerous alternative electronic devices including, without limitation, discrete components, specialized integrated circuits such as comparators, a microcontroller, or by using a conventional computer and software, and that the controller can use either analog or digital circuitry.

In a broad aspect, the specific controller embodiment 500 comprises interconnected sub-circuits including a preferably weatherproof connector 510 to enable controller 500 to connect to a wiring harness with wires that attach to power and ground sources, as well as engine sensors, actuators 102 or 122, and a controller interface module 700 (further described below). Power sub-circuit 520 provides a signal to microcontroller 540 indicating operation of the ignition circuits for the master and slave engines. Sensor sub-circuit 530 receives the input signals from the master and slave engines indicating their rotational speed, and translates those signals for processing by microcontroller 540. Microcontroller 540 is responsible for analyzing the engine signals and, where adjustments are needed, providing a signal to actuator controller sub-circuit 560 which, in turn, controls actuator(s) 102, 122. User interface controller sub-circuit 550 allows microcontroller 540 to interact with controller interface module 700 by receiving inputs from preferably three user interface buttons and displaying system status and programming information on an LCD display, as is discussed further below.

Figure 6:
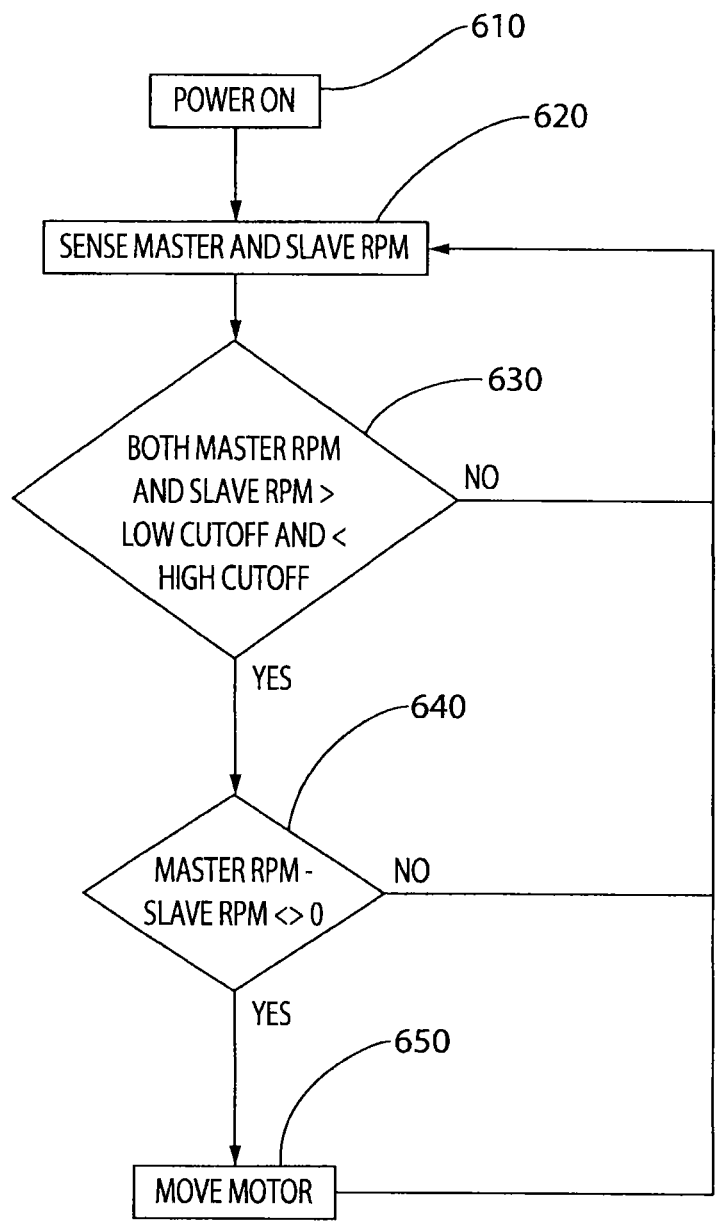
FIG. 6 is a flowchart illustrating the instructions embedded in the microcontroller in the embodiment illustrated in FIG. 5.

FIG. 6 illustrates a flowchart illustrating an embodiment of a program capable of causing microcontroller 540 to operate the engine synchronizer of the present invention. Upon power up 610, the master and slave engine RPMs are sensed 620. If both master engine RPM and slave engine RPM are greater than a predetermined low cutoff value and less than a high cutoff value 630, the difference between the RPM values is calculated. If the difference is greater than 0 (or a predetermined minimal acceptable variance value) 640, signals are generated to cause actuator controller sub-circuit 560 to move actuator 102, 122 in order to trim the throttle of the slave engine to match the RPM speed of the master engine. If either the master engine or the slave engine are operating outside the low cutoff to high cutoff range 630, or the difference between the master engine RPM and slave engine RPM are zero 640, then no adjustment to actuator 102, 122 is made. This cycle is repeated continuously until the power is turned off, thereby enabling a constant monitoring and trimming cycle. It will be understood that while the foregoing description described operations in terms of a master engine and a single slave engine, multiple slave engines could likewise be controlled in the same manner by repeatedly comparing the input from each slave engine to the master engine, and generating signals to move the appropriate actuator 102, 122 as necessary to keep all engines synchronized causing actuator(s) 102, 122 to move their corresponding throttle plate(s) automatically in response signals corresponding to the operating rotational speed of the corresponding engine(s).

While a variety of components could conveniently be used to construct controller 500 (including both sub-circuit assemblies constructed of discrete electronic components and sub-circuit assemblies comprising integrated circuits), a simple microcontroller such as the PIC18F2221 available from Microchip Technology, Inc. of Chandler, Ariz. is suitable for use in as microcontroller 540, and a simple motor driver such as the L6219 stepper motor driver available from STMicroelectronics of Geneva, Switzerland is suitable for use in actuator controller sub-circuit 560.

Figure 7:
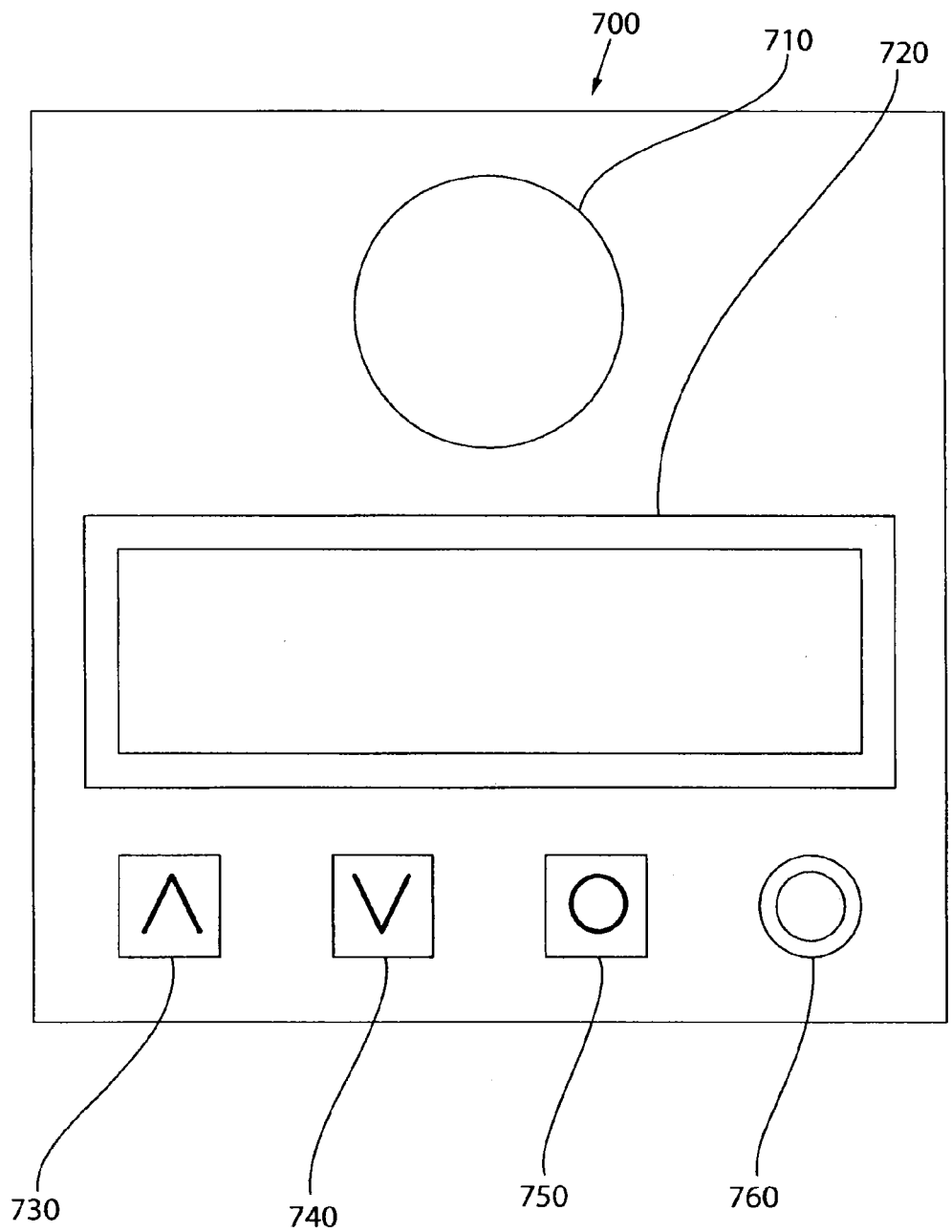
FIG. 7 is a plan view of an embodiment of a user interface panel suitable for use with an engine synchronization apparatus according to the present invention.

Referring now to FIG. 7, an embodiment of controller interface 700 comprises power switch 710 and display 720. Power switch 710 may be a simple on-off switch adapted to apply power to both controller 500 and controller interface 700. Display 720 may be a LCD display adapted to enable controller 500 to display status information to the user, and allow for inputs (such as specifying desired low cutoff and high cutoff ranges) from the user. Buttons 730, 740, 750 may be adapted to enable selection of operational parameters or inputs of discrete values in conjunction with display 720 as is understood in the art. Microcontroller 540 may have additional programming, not further described herein but well understood by those of skill in the art, to operate display 700 and accept input from buttons 730, 740, 750. LED 760 serves as an indication that the system is operational, and is likewise controlled by microcontroller 540. Controller interface module 700 may conveniently be mounted near the vehicle's control station and controller 500 may either be integrated as a component within controller interface module 700.

The present apparatus and system has a number of advantages and benefits compared to certain devices of the prior art. The apparatus and system provide only limited authority of the throttle stroke, most preferably about 20% authority. It does not provide full throttle control but a throttle trim function only. There are certain situations during vessel operation where non-synchronous operation is desirable, such as evasive maneuvers where the difference in engine speed will assist in abrupt direction change of the vessel.

Additionally, the device can be readily configured, for example by programming the microcontroller 540, to operate only when turned on by the operator and to turn synchronization off when the engine speed drops below a predetermined minimum when synchronization is not necessary such as, for example, during docking maneuvers. The controller can also comprise a self-calibration function to accommodate diverse engine types. For example, the controller can be readily programmed to sample and calibrate to the idle speed of the instant engine. Such a facility is advantageous because, for example, the tachometer of a four cylinder, four-stroke engine running at 2000 rpm might yield a sensor signal of 1000 pulses per minute, while a four cylinder, two-stroke engine may yield 2000 pulses per minute.

In the most preferred embodiments, the controller comprises a feature programmed into the microcontroller 540 that keeps the actuator towards the mid-point of its stroke. This is advantageous to avoid the actuator reaching the limits of its stroke, which would prevent further synchronization in one direction. An exemplary algorithm includes the steps of determining from the sensor inputs that the operator is changing the throttle positions to accelerate or decelerate, during which time the microcontroller adjusts the actuator towards the mid-point of its stroke. The limits of the actuator stroke can be detected from an increase in the current drawn as the actuator encounters resistance, or by using one or more switches positioned at the limits and/or midpoint of the actuator stroke. In the case of a stepper motor, the midpoint can be determined by counting motor steps forwards and backwards.

The small package size and simplicity of interface allows this system to be applied to many marine applications. This system may also be applied to any multi-engine vessel, aircraft, or device where the engine control consists of a cable or similar actuation. Marine applications include but are not limited to inboard, inboard/outboard or outboard configurations that are 2, 3, 4, 6, or 8 cylinders, and to 2- and 4-cycle gasoline and diesel engines actuated with throttle cables or the like.

The apparatus and system of the present invention can be used as follows. During normal operation, the operator activates the system by pressing power button 710 and positions the throttle controls to accomplish the desired vessel speed. In a marine environment, the port and starboard throttles are maintained at similar displacements. With a predetermined maximum actuator movement, the slave engine cable length is trimmed to match the speed of the master and slave engines. Preferably about one-half inch trim movement is sufficient for engine synchronization under all desired conditions and allows for full engine authority by the operator through the total speed range. The present apparatus and system also allows the port and starboard throttle controls to remain side by side, a desirable parameter for some operators.

While the invention has been described in connection with its preferred embodiments, it should be recognized that changes and modifications can be made therein without departing from the scope of the appended claims.

What is claimed:

1. An apparatus for adjusting the speed of an engine, said apparatus comprising:
an actuator operably connected to a shaft having an axis and a distal end, said actuator being adapted to displace said shaft along said axis;
a bracket comprising a first bracket end adapted to operably connect to a throttle cable and an opposing second bracket end attached to said actuator such that said shaft extends generally toward said first bracket end;

said shaft further comprising a coupling operably connected to said shaft and adapted to connect to a throttle plate such that said displacement of said shaft moves said coupling, thereby moving said throttle plate without substantially moving said bracket; whereby adjustment of said throttle cable moves said bracket, thereby causing said coupling to move said throttle plate, and actuation of said actuator causes said shaft to move said coupling thereby moving said throttle plate without substantially moving said bracket.

2. The apparatus according to claim 1, further comprising a controller adapted to receive a signal corresponding to the operating speed of said engine and to control the actuation of said actuator whereby said controller causes said actuator to move said throttle plate automatically in response to said signal.

3. The apparatus according to claim 2, further comprising a controller interface comprising a power switch and a display;

said power switch being adapted to activate and deactivate said controller and said display;

said display being electrically connected to said controller.

4. The apparatus of claim 1 wherein said actuator is a piezoelectric actuator.

5. The apparatus of claim 1 wherein said actuator comprises an electric motor.

6. The apparatus of claim 5 wherein said electric motor is a rotary stepper motor.

7. The apparatus of claim 5 wherein said electric motor comprises a diaphragm motor.

8. The apparatus of claim 1 wherein said actuator comprises a voice coil.

9. The apparatus of claim 1 wherein said actuator comprises a hydraulic cylinder.

10. The apparatus of claim 1 wherein said actuator comprises a pneumatic cylinder.

11. The apparatus of claim 1 wherein said bracket further comprises an aperture and at least a portion of said coupling extends through said aperture.

12. A system for synchronizing the rotational speeds of a plurality of engines of a vehicle, the system comprising:
   a master engine and at least one slave engine;
   an actuator assembly connected to said at least one slave engine, said actuator assembly comprising an actuator operably connected to a shaft having an axis and a distal end, said actuator being adapted to displace said shaft along said axis;
   a bracket comprising a first bracket end adapted to operably connect to a throttle cable and an opposing second bracket end attached to said actuator such that said shaft extends generally toward said first bracket end;
   said shaft further comprising a coupling operably connected to said shaft and adapted to connect to throttle plate operably connected to said slave engine such that said displacement of said shaft moves said coupling, thereby moving said throttle plate without substantially moving said bracket;
   a master engine sensor capable of generating a signal corresponding to the rotational speed of said master engine;
   a slave engine sensor capable of generating a signal corresponding to the rotational speed of said at least one slave engine;
   a controller adapted to compare said signal corresponding to the rotational speed of said master engine and said signal corresponding to the rotational speed of said slave engine, and to cause said actuator to adjust said throttle plate of said slave engine to reduce said difference
   whereby the rotational speed of said slave engine is synchronized to the rotational speed of said master engine.

13. The system of claim 12 wherein said controller is adapted to cause said actuator to adjust said throttle plate of said slave engine when said rotational speed of said master engine is within a predetermined range and said difference is less than a predetermined upper limit.

14. The system of claim 12 wherein further comprising
   a plurality of slave engines, each said slave engine having
      a sensor capable of generating a signal corresponding to the rotational speed of said slave engine;
   each said slave engine having an actuator assembly attached to said slave engine, said actuator assembly comprising an actuator operably connected to a shaft having an axis and a distal end, said actuator being adapted to displace said shaft along said axis;
   a bracket comprising a first bracket end adapted to operably connect to a throttle cable and an opposing second bracket end attached to said actuator such that said shaft extends generally toward said first bracket end;
   said shaft further comprising a coupling operably connected to said shaft and adapted to connect to the throttle plate of said slave engine such that said displacement of said shaft moves said coupling, thereby moving said throttle plate without substantially moving said bracket;
   and wherein said controller is adapted to compare said signal corresponding to the rotational speed of said master engine and each said signal corresponding to the rotational speed of each of said slave engines, and to cause said actuator assembly attached to each said slave engine to adjust said throttle plate of said slave engine to reduce said difference
   whereby the rotational speed of each said slave engine is synchronized to the rotational speed of said master engine.

15. The system of claim 12, further comprising
   a controller interface comprising a power switch and a display;
   said power switch being adapted to activate and deactivate said controller and said display;
   said display being electrically connected to said controller.

16. The system of claim 12 wherein said actuator is a piezoelectric actuator.

17. The system of claim 12 wherein said actuator comprises an electric motor.

18. The system of claim 12 wherein said actuator comprises a hydraulic cylinder.

19. The system of claim 12 wherein said actuator comprises a pneumatic cylinder.

20. The system of claim 12 wherein said bracket further comprises an aperture and at least a portion of said coupling extends through said aperture.

21. An apparatus for adjusting the speed of an engine, said apparatus comprising:
   an actuator operably connected to a shaft, said actuator being adapted to displace said shaft;
   a first bracket comprising a first bracket end adapted to operably connect to a throttle cable and an opposing second bracket end attached to said shaft;
   a second bracket assembly connected to said actuator and comprising a coupling adapted to connect to a throttle plate such that displacement of said shaft causes said actuator to move, thereby moving said second bracket assembly and said throttle plate without substantially moving said first bracket; whereby adjustment of said throttle cable moves said first bracket, said shaft and said actuator, thereby causing said coupling to move said throttle plate, and actuation of said actuator causes said actuator to move said coupling.

\* \* \* \* \*